(12) United States Patent
Moeller

(10) Patent No.: US 6,842,436 B2
(45) Date of Patent: Jan. 11, 2005

(54) MULTIPORT-RAM MEMORY DEVICE

(75) Inventor: Heinrich Moeller, Gilching (DE)

(73) Assignee: Siemens Aktiengesellschaft, Munich (DE)

( * ) Notice: Subject to any disclaimer, the term of this patent is extended or adjusted under 35 U.S.C. 154(b) by 210 days.

(21) Appl. No.: 10/149,718

(22) PCT Filed: Dec. 13, 2000

(86) PCT No.: PCT/DE00/04431

§ 371 (c)(1),
(2), (4) Date: Jun. 14, 2002

(87) PCT Pub. No.: WO01/45109

PCT Pub. Date: Jun. 21, 2001

(65) Prior Publication Data

US 2002/0184447 A1 Dec. 5, 2002

(30) Foreign Application Priority Data

Dec. 17, 1999 (DE) .......................................... 199 61 138

(51) Int. Cl.[7] .............................................. H04B 7/212
(52) U.S. Cl. ....................... 370/321; 370/337; 370/347; 370/442; 711/131
(58) Field of Search .................................. 370/321, 336, 370/337, 347, 442; 711/131

(56) References Cited

U.S. PATENT DOCUMENTS

| 4,135,060 A | * | 1/1979 | Heckel et al. | ............... 370/522 |
| 4,387,457 A | * | 6/1983 | Munter | ....................... 370/267 |
| 5,422,858 A | * | 6/1995 | Mizukami et al. | .......... 365/233 |

FOREIGN PATENT DOCUMENTS

| JP | 357063925 A | * | 4/1982 | ................... 334/45 |

* cited by examiner

Primary Examiner—Matthew Kim
Assistant Examiner—Hetul Patel
(74) Attorney, Agent, or Firm—Morrison & Foerster LLP

(57) ABSTRACT

The invention relates to a multiport-RAM memory device, comprising a RAM memory unit (1), a number of serial/parallel converters (5, 6, 7) and a parallel/serial converter (10), for converting serial signals into parallel signals. Said multiport-RAM memory device further comprises a control unit (11) and two timeslot allocation devices (8, 9), whereby an emulation of a number of connections by using the simple RAM memory unit (1) may be achieved. Furthermore, a power controller (12) can significantly reduce the power demand.

12 Claims, 5 Drawing Sheets

FIG 6

| CM control word SW |
|---|
| Bit 20 | Bit 19 | Bit 18 | Bit 17 | Bit 16 | Bit 15 | Bit 14 | Bit 13 | Bit 12 | Bit 11 | Bit 10 | Bit 9 | Bit 8 | Bit 7 | Bit 6 | Bit 5 | Bit 4 | Bit 3 | Bit 2 | Bit 1 | Bit 0 |

| Sel. | | | | | Adr. | | | | | | | |
|---|---|---|---|---|---|---|---|---|---|---|---|---|
| Bit 4 | Bit 3 | Bit 2 | Bit 1 | Bit 0 | Bit 11 | Bit 10 | Bit 9 | Bit 8 | Bit 7 | Bit 6 | Bit 5 | Bit 4 | Bit 3 | Bit 2 | Bit 1 | Bit 0 |

MULTIPORT-RAM MEMORY DEVICE

CLAIM FOR PRIORITY

This application claims the benefit of priority under 371 to PCT/DE00/04431, which was published in the German language on Jun. 21, 2001, which claims the benefit of priority to German Application DE 199 61 138.6, filed in the German language on Dec. 17, 1999.

TECHNICAL FIELD OF THE INVENTION

The present invention relates to a multiport memory device, and in particular, to a multiport RAM memory device as used with speech memory in a switching network of a telecommunications switching system.

BACKGROUND OF THE INVENTION

FIG. 1 shows a conventional multiport RAM memory device, in which a RAM memory device 1* has a multiplicity of ports. In accordance with FIG. 1, in this case data input signals DIN are stored via a write port 40 (WP) in memory cells (not illustrated) of the RAM memory device 1*. For separate read-out via a multiplicity of ports, associated address signals Adr0 to Adr3 are applied for example to address/control ports 20, 21, 22 and 23 (ACP), corresponding data output signals DOUT0 to DOUT3 being output at associated read ports 30, 31, 32 and 33 (RP). In this way, a multiplicity of drive units can access the individual memory cells in the RAM memory device via the multiplicity of ports. The RAM memory device is in this case a random access memory device (RAM).

One disadvantage in conventional multiport RAM memory devices is that there is an extremely high area requirement and outlay on wiring. The production costs of such a multiport RAM memory device, in particular as an integrated module, are therefore extremely high. Furthermore, the power loss of such a hardwired multiport RAM memory device is extremely high, for which reason it cannot be used in particular in switching networks for the realization of the speech memories situated therein.

DE 197 09 210 A1 discloses a RAM memory circuit as is illustrated in a simplified fashion in FIG. 2. In this case, a multiport RAM memory device or memory device with multiple ports is created using a so-called single port RAM memory unit 1 (single port RAM), a multiplexer unit M and a multiplicity of buffer devices P. In this case, via a bidirectional data bus, both the data input signals and the data output signals are transferred from the respective buffers P to the write port 4 or read port 3 of the single port RAM memory unit 1. The multiplexer M switches through one of the multiplicity of address signals Adr0 to Adr3 to the common address/control port 2 of the RAM memory unit 1 in a manner dependent on a clock supply T. A RAM memory device with a multiplicity of ports is obtained using a cost-effective single port RAM memory unit 1 (single port RAM). However, there is a relatively low data throughput and occurrence of bus contentions on the bidirectional data bus. Furthermore, a power consumption of such a conventional multiport RAM memory device is extremely high.

SUMMARY OF THE INVENTION

The invention discloses a multiport RAM memory device which enables a high data throughput, i.e. short access times, and a cost-effective realization. Furthermore, the intention is for the power consumption to be significantly reduced.

In particular by virtue of the use of a single port RAM memory unit (single port RAM) in conjunction with a multiplicity of serial/parallel converters for address signals, selection signals and data input signals and also a parallel/serial converter for the data output signals, a RAM memory device with a multiplicity of ports is obtained in a cost-effective manner, a high data throughput being realized.

The multiport RAM memory device preferably has a power control unit for controlling a power consumption in a manner dependent on write/read cycles that are actually carried out, as a result of which a total power consumption is significantly reduced.

The multiport RAM memory device preferably includes a speech memory in a time switching unit of a switching network in a digital telecommunications switching system, as a result of which switching networks with a very low power loss can be realized cost-effectively.

BRIEF DESCRIPTION OF THE DRAWINGS

The invention is described in more detail below using an exemplary embodiment with reference to the drawing.

In the figures:

FIG. 6 shows a detailed representation of a control word used in the switching network according to FIG. 5.

DETAILED DESCRIPTION OF THE INVENTION

Figure 1:
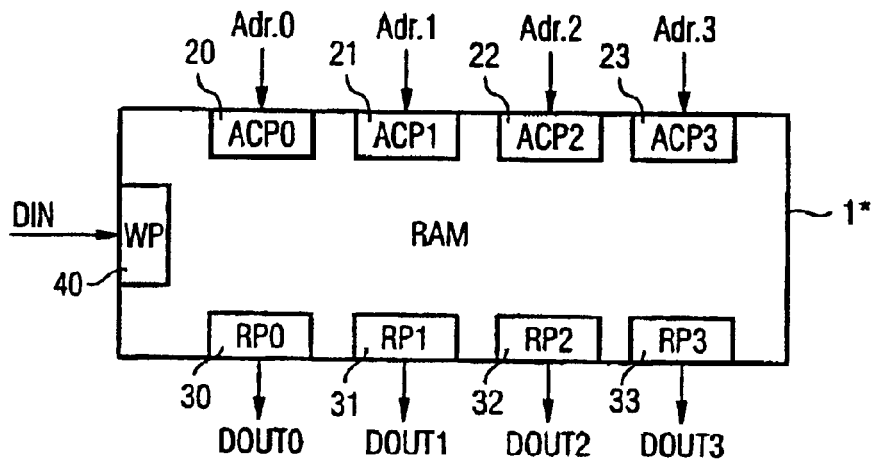
FIG. 1 shows a hardwired multiport RAM memory device according to the prior art.
Figure 2:
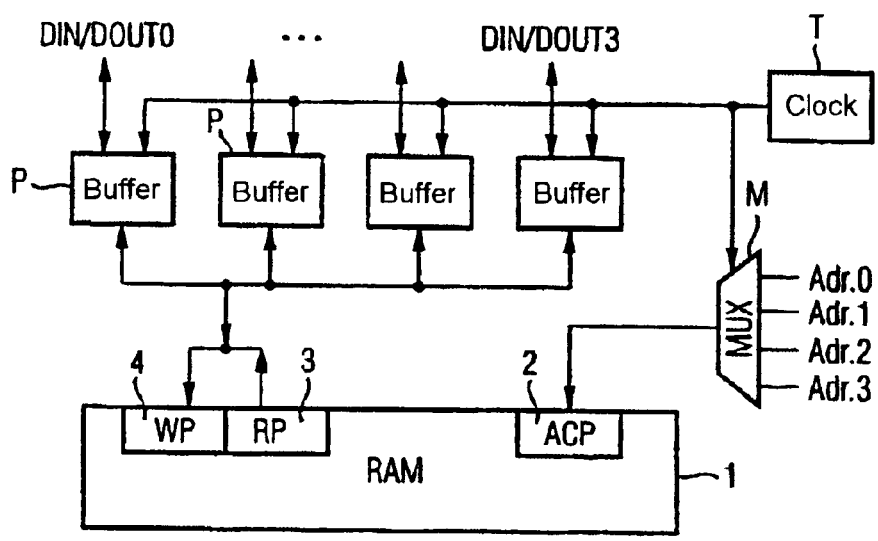
FIG. 2 shows a time-controlled multiport RAM memory device according to the prior art.
Figure 3:
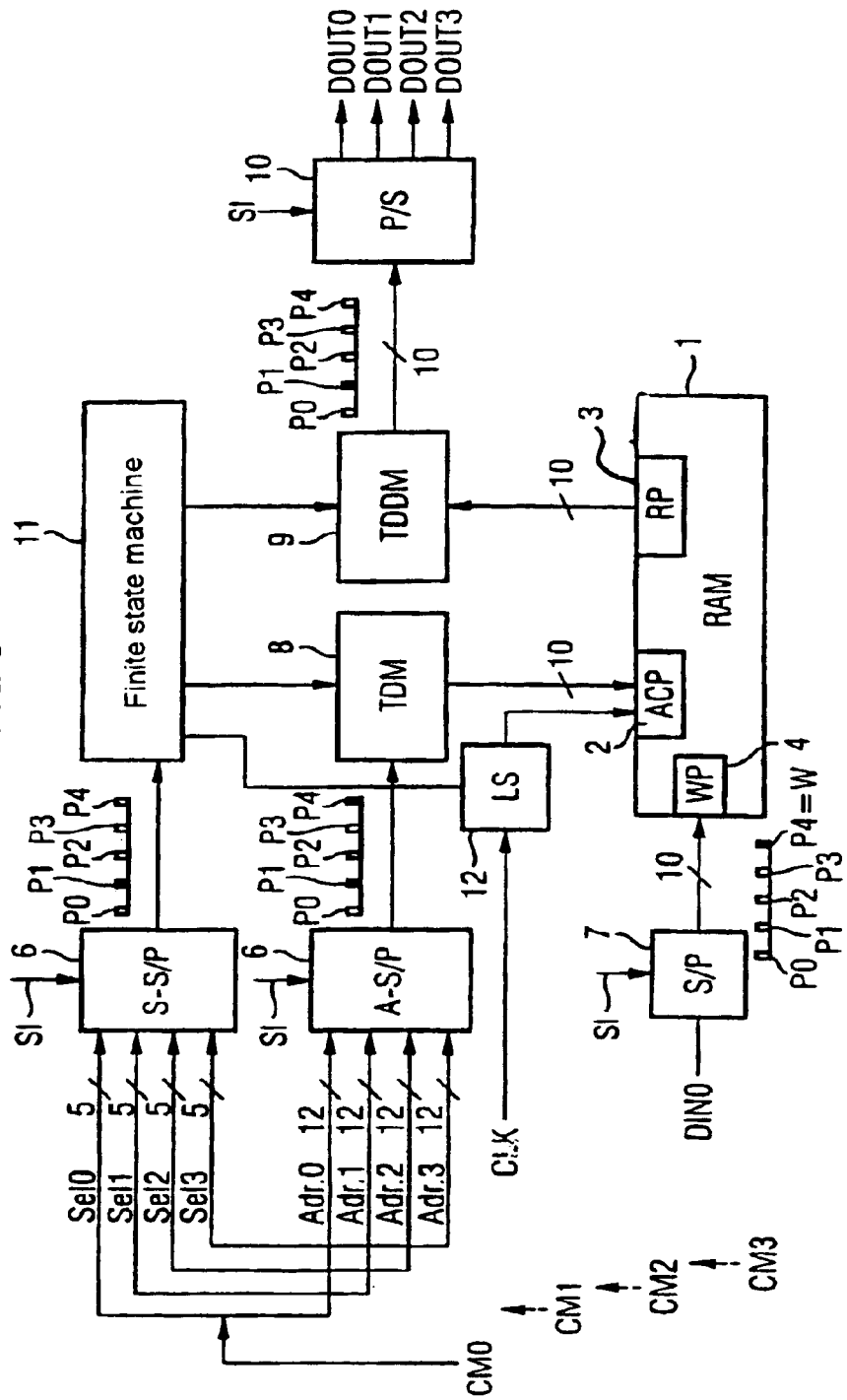
FIG. 3 shows a multiport RAM memory device according to the present invention.

FIG. 3 shows a simplified block representation of a multiport RAM memory device according to the present invention, identical reference symbols representing components identical or similar to those in FIG. 1 or 2. A detailed description of these components appears below.

In FIG. 3, the reference symbol 1 designates a single port RAM memory unit (single port RAM) having an address/control port 2 (ACP), a read port 3 (RP) and a write port 4 (WP). This single port RAM memory unit 1 preferably has 2304 memory cells with a data width of m=10 bits, for example, as a result of which 2304 data channels can be switched or coupled for example in the case of the use as speech memory in a switching network of a telecommunications switching system.

The RAM memory unit 1 is operated in a first time division multiplex system, use preferably being made of a time division multiplex system which has n time slots or data channels P0, P1, P2, P3 and P4 (n=5) for a number of n ports to be realized.

Since, in the case of realizing a five-port RAM, for example, the data rate at the direct ports 2, 3 and 4 of the RAM memory unit 1 would be quintupled relative to a second time division multiplex system to be driven, the present invention uses a multiplicity of serial/parallel converters and a parallel/serial converter for converting serial signals of a second time division multiplex system into parallel data buses having a width of m bits within the first time division multiplex system. In the opposite direction, the parallel data buses having a width of m bits are converted back into serial data signals again by parallel/serial converters. This yields a reduction of the data rate or a clock rate in the first time division multiplex system by m fold relative to the external second time division multiplex system. A detailed description for explaining the advantages with the use of a first and second time division multiplex system is described below.

In accordance with FIG. 3, the multiport RAM memory device according to the invention accordingly has a data input serial/parallel converter 7 for converting, for example, a serial data input signal DIN0 of the second or external time division multiplex system into at least one parallel data output signal of the first time division multiplex system.

Figure 4:
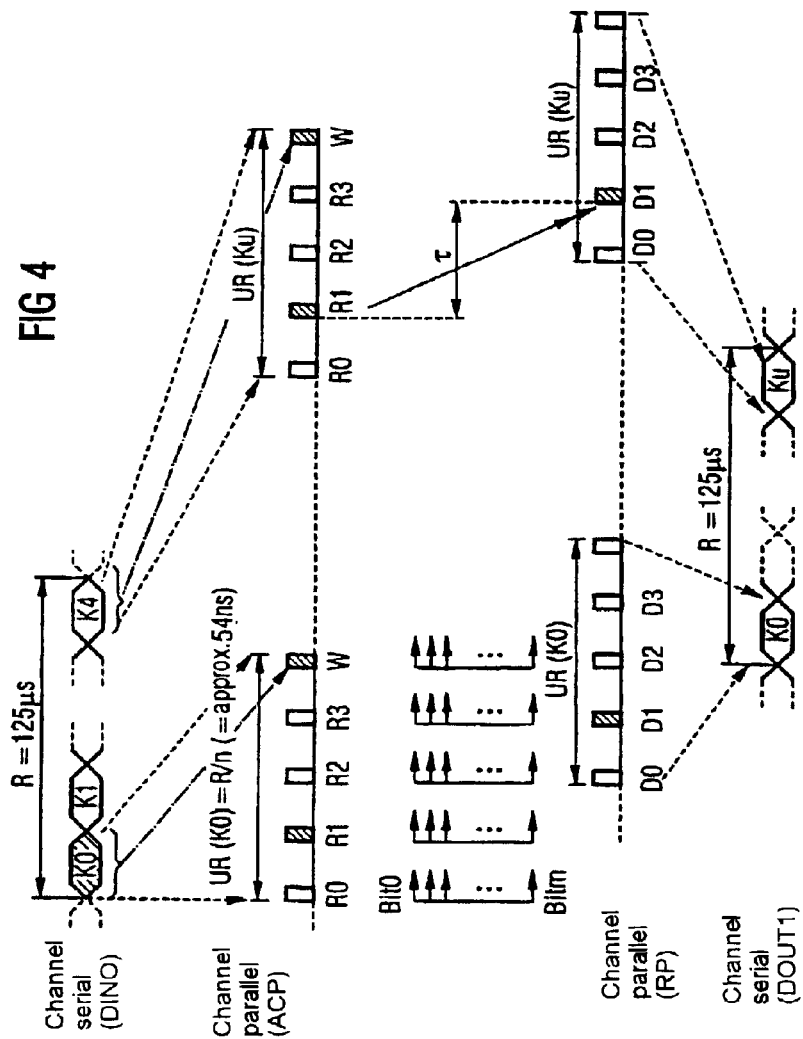
FIG. 4 shows a simplified temporal representation of a first and second time division multiplex system used in FIG. 3.

FIG. 4 shows a simplified temporal representation for illustrating such a serial/parallel conversion. A data input signal DIN0 accordingly comprises u+1 serial data channels k0 to ku, which are transmitted in a frame R having a length of 125 µs, for example.

In the case where the multiport RAM memory device is used as speech memory in a switching network of a telecommunications switching system, the frame R has, for example, u+1=2304 data channels with 16 times 128 useful channels and 2 times 128 test channels. Each data channel furthermore has a data width of m=10 bits, 8 bits being available as useful channel data and 2 bits as test channel data.

In accordance with FIG. 4, a data channel k0 accordingly has a width of 10 bits, which are then converted into a parallel data bus of the first time division multiplex system, said data bus having a width of 10 bits, by the serial/parallel converter 7. The first time division multiplex system in this case has a frame width UR of approximately 54 ns, 5 time slots P0 to P4 being formed in order to realize n=5 ports. In accordance with FIG. 4, the write port 4 is now assigned a time slot W (write) in the first time division multiplex system with the frame UR. As is represented in a simplified manner in FIG. 4, the 10 bits transmitted serially in the data channel k0 are accordingly converted onto a parallel data bus having a width of 10 bits and are transmitted simultaneously at the instant or the time slot W to the write port 4 of the RAM memory unit 1.

By virtue of the conversion of the serial data signal onto a bit-parallel data bus, a 10-fold reduction of a data rate in the first time division multiplex system is obtained in the case of a data width of m=10 bits. By virtue of this reduction of the data rate it is possible, in turn, to insert a time division multiplex system with 5 time slots, for example, as a result of which essentially 5 ports can be realized simultaneously.

At a typical data rate of approximately 184 Mbit/s in the second time division multiplex system, the first time division multiplex system merely has a data rate of approximately 92 Mbit/s, but a 5-port RAM memory device can be realized with a single port RAM memory unit 1.

Returning to FIG. 3, an address serial/parallel converter 5 carries out, in a similar manner, a conversion of a multiplicity of serial address signals Adr0 to Adr3 of the second time division multiplex system into a multiplicity of parallel address signals of the first time division multiplex system. A selection serial/parallel converter 6 converts, in a similar manner, a multiplicity of serial output signals Sel0 to Sel3 of the second time division multiplex system into a multiplicity of parallel selection signals of the first time division multiplex system. By contrast, a parallel/serial converter 10 converts the multiplicity of parallel data output signals of the first time division multiplex system into a multiplicity of serial data output signals DOUT0 to DOUT3 of the second time division multiplex system, as a result of which an original data rate of, for example, approximately 184 Mbit/s is again obtained.

For selectively feeding the parallel address signals to the address/control port 2 of the RAM memory unit 1, the multiport RAM memory device has a first time slot assignment unit 8, which preferably comprises a time division multiplexer. Furthermore, the multiport RAM memory device has a second time slot assignment unit 9, which preferably comprises a time division demultiplexer which assigns the parallel data output signals, read out at the read port 3 of the RAM memory unit 1, into predetermined time slots of the first time division multiplex system and feeds them to the parallel/serial converter 10. In this case, a control unit 11 serves essentially for driving the first and second time slot assignment units 8 and 9, said control unit preferably being formed from a finite state machine (finite data machine) with integrated time control. A multiport RAM memory device with which a multiplicity of ports can be realized with a high data throughput is obtained in this way using a cost-effective single port RAM memory unit 1 (single port RAM).

Furthermore, the multiport RAM memory device may have a power control unit 12 for controlling a power consumption of the RAM memory unit 1 in a manner dependent on the control unit 11. More precisely, the power control unit 12 is driven by the control unit 11 in a manner dependent on the selection and address signals present such that a supplied clock signal CLK of, for example, approximately 92 MHz is switched through only for the respectively relevant time slots P0 to P4 in the first time division multiplex system. This means, for example, that in the absence of read commands, i.e. in the absence of address or selection signals, the RAM memory unit 1 is clocked only for the time slot P4 in which, for example, data are written via the write port 4. For this purpose, the power control unit 12 is preferably connected to the address/control port 2 of the RAM memory unit 1.

The method of operation of the multiport RAM memory device for the read-out of a predetermined memory cell in the RAM memory unit 1 by means of a port P1 is described below.

As has already been explained above with reference to FIG. 4, a data input signal fed in at the data input serial/parallel converter 7 or an associated data value, in a data channel k0, for example, is fed to the write port 4 in a bit-parallel manner in a write slot W or P4 of the first time division multiplex system. The further time slots P0 to P3 are used for example as read channels R0, R1, R2 and R3 for the address signals or as data channels D0, D1, D2 and D3 for the data output signals DOUT0 to DOUT3. If, by way of example, a control device CM1 (not described in any greater detail) drives the address signals Adr1 and selection signals Sel1 in such a way that the multiport RAM memory device "feels" addressed or is identified as selected by the control unit 11, then the address bits converted by the address serial/parallel converter 5 are assigned into the time slot R1 by the first time slot assignment unit 8 and fed to the address/control port 2 of the RAM memory unit 1. At the same time, the control unit 11 drives the power control unit 12 in such a way that, for example, the clock signals CLK are forwarded to the address/control port 2 of the RAM memory unit 1, as a result of which a power consumption arises for the read time slot R1 and for the write time slot W. For the further read time slots R0, R2 and R3 that are not used, the clock signals are switched off, for example, as a result of which the power consumption is reduced in a manner dependent on an actual driving. The power consumption of an overall system can thus be significantly improved.

The outputting of the data in the memory cells addressed by the address/control port 2 is effected in a similar manner to the reading described above in the first time division multiplex system. In this case, after a delay time τ, which essentially results from the circuit properties of the RAM memory unit 1, the data output at the read port 3 are again assigned to the predetermined time slots of the first time division multiplex system by means of the second time slot assignment unit 9 and forwarded to the parallel/serial converter 10. More precisely, a data value read out through the addressing in the read time slot R1 is read out at the read port 3 in such a way that its bit-parallel data are again present in the data output time slot D1 of the first time division multiplex system. In this case, the control unit 11 calculates the delay time τ and drives the second time slot assignment unit 9 in such a way that there is a fixed relationship between the read time slot R1 and the data output time slot D1. Afterward, the bit-parallel datastream is again converted into a serial datastream by the parallel/serial converter 10, which datastream is transmitted for example in the data channel k0 to ku of the second time division multiplex system with the data rate of 184 Mbit/s.

The serial/parallel converters 5, 6 and 7 and the parallel/serial converter 10 are driven essentially by a synchronizing pulse SI, which enables a frame synchronization and also an optimization of propagation times or latencies in the system between the first and second time division multiplex systems. In this way, a particularly cost-effective realization of a multiport RAM memory device is obtained which has an extremely low power consumption and is thus outstandingly suitable in particular for switching networks in telecommunications switching systems.

Figure 5:
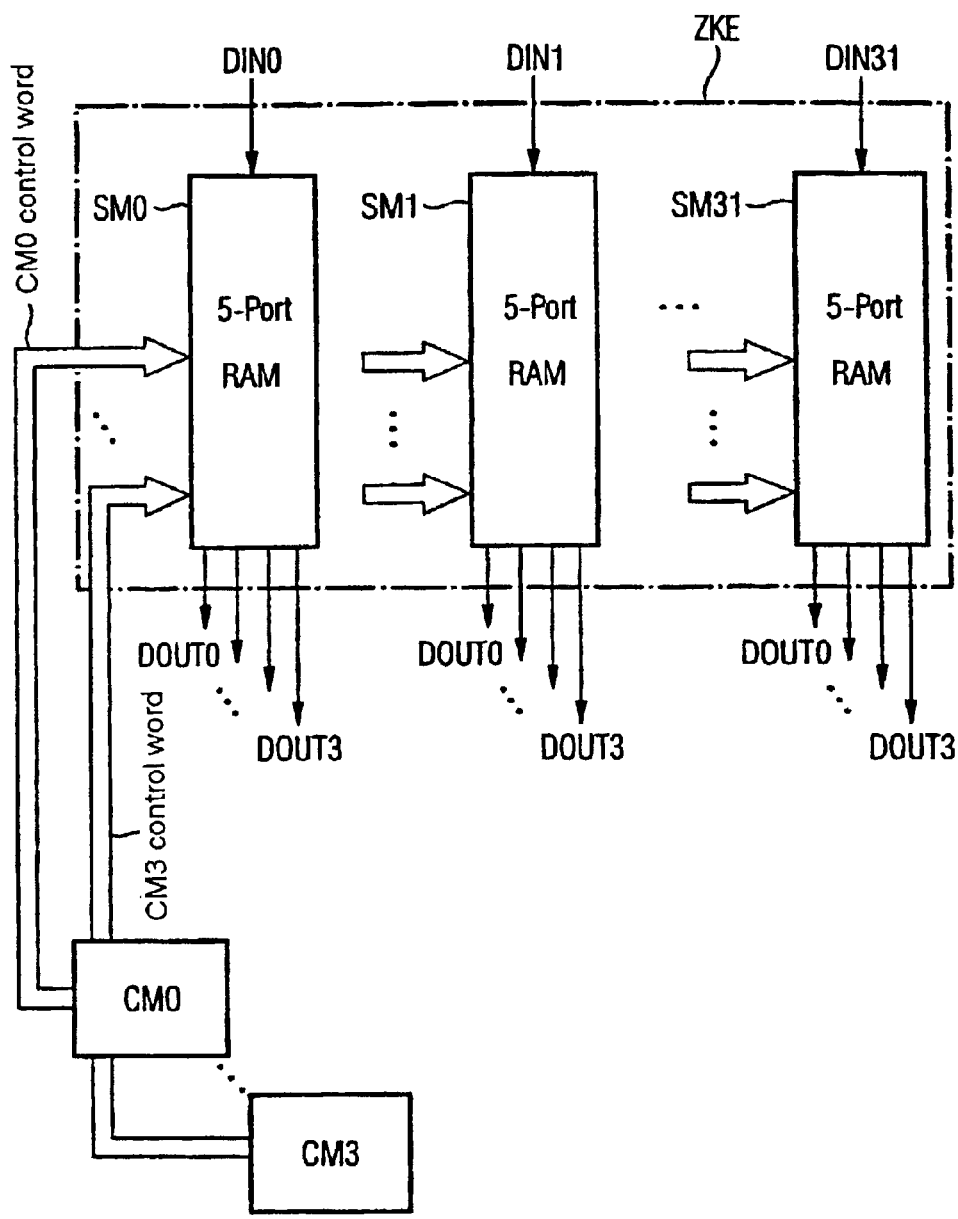
FIG. 5 shows a simplified block representation for the use of the multiport RAM memory device according to the invention in a switching network.

FIG. 5 shows a simplified block representation for the use of the multiport RAM memory devices according to the invention as speech memories SM0 to SM31 in a switching network of a telecommunications switching system.

In a switching network of this type, in particular time switching units ZKE for the temporal assignment of data channels—to be switched—of the datastreams or data signals DIN0 to DIN31 are realized by a multiplicity of multiport RAM memory devices which are driven by a multiplicity of control devices CM0 to CM3. In this case, the control devices CM0 to CM3 preferably constitute in the connecting memories which, in order to realize a data channel switching, drive each individual speech memory SM0 to SM31 in a targeted manner via fixedly defined connecting memory control words SW.

FIG. 6 shows a detailed representation with regard to the significance of the respective bits in such a connecting memory control word SW. In accordance with FIG. 6, a connecting memory control word SW comprises 21 bits, the first 12 bits serving for memory addressing and thus corresponding to the address signals Adr0 to Adr3. In accordance with FIG. 6, the memory selection for selecting a predetermined speech memory SM0 to SM31 is transmitted in the further 5 bits of the connecting memory control word SW. The further bits of the connecting memory control word SW are not of significance to the present invention, for which reason a detailed description is dispensed with below. Accordingly, in accordance with FIG. 5, in a switching network or an associated time switching unit ZKE, there is the need for each speech memory SM0 to SM31 to be able to be driven via four different connecting memory control words SW0 to SW3 of the associated connecting memories CM0 to CM3 in order to obtain the correspondingly switched data channels on the associated data output lines DOUT0 to DOUT3. In particular with the use of a multiplicity of time switching units ZKE in a switching network, this results in a particularly cost-effective realization of the switching network, a power loss being minimal. In this way, it is possible to realize blocking-free switching networks that have not been known heretofore and have a size that has not been known heretofore.

The invention has been described above using a multiport RAM memory device for a switching network. However, it is not restricted thereto, but rather comprises all other multiport RAM memory devices which can be used in arbitrary circuits. In the same way, the first time division multiplex system is not restricted to a frame with five time slots and the second time division multiplex system is not restricted to a frame with 2304 time slots. Rather, all other time division multiplex systems which essentially enable a frame synchronization are possible. In the same way, the above invention has been described using a single write port. However, it is also possible to realize a plurality of write ports.

What is claimed is:

1. A multiport RAM memory device, comprising:

a RAM memory unit having an address/control, a read port and a write port for a first time division multiplex system;

an address serial/parallel converter for converting a multiplicity of serial address signals of a second time division multiplex system into a multiplicity of parallel address signals of the first time division multiplex system;

a selection serial/parallel converter for converting a multiplicity of serial selection signals of the second time division multiplex system into a multiplicity of parallel selection signals of the first time division multiplex system;

a data input serial/parallel converter for converting at least one serial data input signal of the second time division multiplex system into at least one parallel data input signal of the first time division multiplex system;

a first time slot assignment unit for selectively feeding the parallel address signals, lying in predetermined time slots of the first time division multiplex system, to the address/control port of the RAM memory unit;

a second time slot assignment unit for assigning parallel data output signals, read out at the read port of the RAM memory unit, into predetermined time slots of the first time division multiplex system;

a parallel/serial converter for converting the multiplicity of parallel data output signals of the first time division multiplex system into a multiplicity of serial data output signals of the second time division multiplex system; and a control unit for controlling the first and second time slot assignment units in a manner dependent on the multiplicity of parallel selection signals, wherein the control unit drives the second time slot assignment unit so as to compensate for a temporal delay during read-out of the parallel data output signals from the RAM memory unit.

2. The multiport RAM memory device as claimed in claim 1, further comprising a power control unit for controlling a power consumption of the RAM memory unit in a manner dependent on the control unit.

3. The multiport RAM memory device as claimed in claim 2, wherein the power control unit controls the power consumption by switching on/off a clock signal for the RAM memory unit for a respective time slot in the first time division multiplex system.

4. The multiport RAM memory device as claimed in claim 1, wherein the serial/parallel converters and the parallel/serial converter are synchronized by a synchronizing pulse.

5. The multiport RAM memory device as claimed in claim 1, wherein
the control unit includes a finite state machine.

6. The multiport RAM memory device as claimed in claim 1, further comprising
a speech memory in a time switching unit of a switching network in a digital telecommunications switching system.

7. The multiport RAM memory device as claimed in claim 1, wherein
the multiplicity of serial address signals and the multiplicity of serial selection signals constitute a multiplicity of control word signals of a multiplicity of connecting memories in a switching network.

8. The multiport RAM memory device as claimed in claim 1, wherein
the first time division multiplex system has n data channels for the realization of n ports.

9. The multiport RAM memory device as claimed in claim 8, wherein
the second time division multiplex system has m data channels, a data input signal being assigned to a predetermined write data channel of the n data channels.

10. The multiport RAM memory device as claimed in claim 9, wherein
further n−1 n data channels are assigned to the n−1 read data channels or to the n−1 address signals and to the n−1 data output channels or to n−1 data output signals.

11. The multiport RAM memory device as claimed in claim 8, wherein n=5.

12. The multiport RAM memory device as claimed in claim 9, wherein m=2304.

* * * * *